United States Patent [19]

Mayer et al.

[11] Patent Number: 5,420,168
[45] Date of Patent: May 30, 1995

[54] METHOD OF LOW PRESSURE AND/OR EVAPORATIVE DRYING OF AEROGEL

[75] Inventors: Steven T. Mayer, San Leandro; James L. Kaschmitter, Pleasanton; Richard W. Pekala, Pleasant Hill, all of Calif.

[73] Assignee: The Regents of the University of California, Oakland, Calif.

[21] Appl. No.: 41,503

[22] Filed: Apr. 1, 1993

[51] Int. Cl.⁶ .................................................. C08J 9/00
[52] U.S. Cl. ...................................... 521/99; 521/113; 521/114; 521/181; 521/64; 502/418; 502/437
[58] Field of Search ................ 521/99, 113, 114, 64, 521/181; 502/418, 437

[56] References Cited

U.S. PATENT DOCUMENTS

| | | | |
|---|---|---|---|
| 4,756,898 | 7/1988 | Hopper et al. | 423/449 |
| 4,832,870 | 5/1989 | Clough et al. | 252/511 |
| 4,832,881 | 5/1989 | Arnold, Jr. et al. | 264/29.7 |
| 4,873,218 | 10/1989 | Pekala | 502/418 |
| 4,997,804 | 3/1991 | Pekala | 502/418 |
| 5,252,620 | 10/1993 | Elliott, Jr. et al. | 521/149 |

OTHER PUBLICATIONS

UCRL-99846, Resorcinol-Formaldehyde Aerogels And Their Carbonized Derivatives, R. W. Pekala et al., Oct. 24, 1988.

*Primary Examiner*—John Kight, III
*Assistant Examiner*—Duc Truong
*Attorney, Agent, or Firm*—L. E. Carnahan; Henry P. Sartorio

[57] ABSTRACT

A process whereby Resorcinol/Formaldehyde (RF) aerogel having a density of about 0.4–1.2 g/cc can be manufactured using a simple air drying procedure. This process is inherently simpler, quicker, and less expensive than the more conventional supercritical or subcritical $CO_2$ extraction procedures. RF aerogels can be used as produced, such as in insulation applications, or pyrolyzed to form carbon aerogels with a density of about 0.9 g/cc for use in applications such as batteries, supercapacitors, etc.

24 Claims, No Drawings

METHOD OF LOW PRESSURE AND/OR EVAPORATIVE DRYING OF AEROGEL

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to organic aerogels, particularly to a method of fabricating organic aerogels having a density of about 0.4–1.2 g/cc, and more particularly to a process whereby organic aerogels, such as resorcinol-formaldehyde aerogels, can be manufactured using a simple air drying procedure.

Foamed organic polymers and organic foam composite materials having relatively low densities are well known and are used in the insulation, construction, and similar industries. Also, machinable and structurally stable, low density ($\sim$0.04 g/cc), micro-cellular ($\sim$15 microns) carbon, and catalytically impregnated carbon foams are known, as exemplified by U.S. Pat. No. 4,756,898 issued Jul. 12, 1988 to R. W. Hopper et al. In addition, electrically conductive open-celled, micro cellular (1–50 microns), carbon foams having a density range of 0.1–1.0 g/cc have been developed, as exemplified by U.S. Pat. No. 4,832,870 issued May 23, 1989 to R. L. Clough et al. Further, low density (0.05–0.07 g/cc), micro cellular ($<$10 microns), foams have been fabricated for use in inertial confinement fusion targets, as exemplified by U.S. Pat. No. 4,832,881 issued May 23, 1989 to C. A. Arnold, Jr. et al.

Development efforts have also been directed to low density organic aerogels which may be carbonized to form low density $\leq$0.1 g/cc)carbon aerogels with a cell size of less than 0.1 micron for use in high-energy physics applications, adsorption of toxic gases, ion exchanger/and as a catalyst support, etc., as exemplified by U.S. Pat. Nos. 4,873,218 issued Oct. 10, 1989 and No., 4,997,804 issued Mar. 5, 1991, each to R. W. Pekala, and paper UCRL-99846, Resorcinol-Formaldehyde Aerogels And Their Carbonized Derivatives, R. W. Pekala et al., dated Oct. 24, 1988. Low and high density carbon foams of this type have also been utilized in super capacitor applications, as described and claimed in Applicants' copending U.S. Patent Application Ser. No. 07/822,438, filed Jan. 17, 1992, now U.S. Pat. No. 5,260,855, issued Nov. 9, 1993, entitled "Supercapacitors Based On Carbon Foams".

While aerogel or foam technology and the potential uses thereof have been extensively described in the art, one of the major technical challenges has been to dew.-,lop a low cost method of producing aerogel materials, whatever the end use. Most of the cost and a large fraction of the processing time of organic aerogels, their carbonized derivatives, and other carbon foams is associated with the drying of the polymeric gel precursors. In the case of aerogels, supercritical drying is the established technique for removing the solvent from the pores of the gel. In an effort to resolve this problem, a method of subcritical drying of polymeric foams, such as resorcinol/formaldehyde (RF) aerogels, has been developed which potentially will substantially lower the capital equipment and processing costs associated with aerogel or foam production (due to the lower required pressures). This new drying procedure is set forth hereinafter in a process for the production of aerogels using a simple evaporative drying procedure.

SUMMARY OF THE INVENTION

It is an object of the present invention to provide a simplified process for producing organic aerogels and their carbonized derivatives.

A further object of the invention is to provide an aerogel fabrication process which reduces processing time and lowers capital equipment and processing costs associated with foam production.

Another object of the invention is to provide a process for the production of aerogels using a simple evaporative drying procedure.

Another object of the invention is to provide an organic aerogel or a carbonized aerogel having a density of about 0.4–1.2 g/cc, for use in thermal or acoustic insulation or in rechargeable batteries, supercapacitors, etc.

Another object of the invention is to provide a simplified process using an evaporative drying procedure for producing carbonized aerogels having a density of 0.4–1.2 g/cc.

Other objects and advantages of the present invention will become apparent from the following description. The foregoing and other objects of this invention are accomplished by reducing the processing time and equipment costs in the fabrication of organic aerogels and other carbon foams associated with the drying of the polymeric gel precursor. This invention utilizes a simple evaporative drying procedure rather than conventional supercritical or subcritical $CO_2$ extraction procedures. In verifying this invention resorcinol/formaldehyde carbon aerogels having a density of 0.4–1.2 g/cc were produced.

DETAILED DESCRIPTION OF THE INVENTION

The invention is directed to a process for producing organic aerogels or their carbonized derivatives or foams using a drying procedure which is inherently simpler, quicker, and less expensive than the conventional supercritical or subcritical $CO_2$ extraction procedures. The term aerogel refers to both inorganic (silica) and organic (carbon) aerogels. This invention is directed only to organic based aerogels and foams. Carbon aerogel is one type of organic foam. This technique has so far only been experimentally verified using resorcinol/formaldehyde (RF) carbon aerogels, but other types of organic aerogels can be produced. The process of this invention involves a simple air drying procedure, and the aerogels so produced can be used as produced or pyrolyzed to form a carbon aerogel, depending on the desired use thereof.

The improved drying procedure of the invention is described hereinafter in detail with respect to the fabrication of intermediate density ($\sim$0.6 g/cc) resorcinol/-formaldehyde (RF) aerogels. The resultant 0.6 g/cc RF aerogel is then pyrolyzed to produce a carbon aerogel having a density of about 0.9 g/cc. Also, while low density ($\leq$0.01 mg/cc), resorcinol/formaldehyde (RF) aerogels having ultra-fine cell or pore size have been previously developed, as exemplified by above-referenced U.S. Pat. Nos. 4,873,218 and No. 4,997,804 issued to R. W. Pekala, coinventor of this invention, the RF aerogel produced by the following description of the present invention is of an intermediate density ($\sim$0.6 g/cc).

In carrying out a process for verifying the air drying procedure of this invention, intermediate density RF aerogels were produced by the following operational sequence:

1. 12.35 g of resorcinol and 17.91 g of 37% formaldehyde were mixed with 5.6 g of 0.1M $Na_2CO_3$ (sodium carbonate) in a glass beaker, for example. Note that in this formulation, no additional water other than that from the formaldehyde or sodium carbonate is used.
2. This mixture was poured into glass vials, sealed, and subsequently cured at room temperature for one (1) day.
3. The gel is then further cured at 50° C. for one day, and then at 90° C. for at least an additional day.
4. The thus formed "aquagel" was then removed from the glass beaker and sliced using a diamond blade saw to produce thin wafers approximately 0.050 inch in thickness.
5. The thus produced wafers were placed in a solvent of acetone, and the acetone was exchanged several times to insure that all of the water had been removed from the pores of the wafers. This process took several (about four) hours.
6. Next, cyclohexane was exchanged for the solvent (acetone) in the wafers in a similar manner as directly above described. This process took several hours.
7. The cyclohexane in the pores of the RF gel wafers was allowed to slowly evaporate in air inside a hood with the wafers placed upright (on edge) so that both sides were exposed to the air, and able to evaporate (dry) at comparable rates. The drying procedure took about 2–3 hours at a temperature of about 20°–50° C. The drying time will vary due to air flow rate and temperature.

If desired, to promote additional cross-linking of the gels, during the initial water to solvent (acetone) exchange, a concentration of <0.1 wt. % of trifluoroacetic acid may be added to the solvent. Also, if desired, the wafers may be air dried at low pressure (approximately 0.1–1.0 atmosphere) or within an evacuated chamber or vacuum oven. Also, after drying, the wafers can be cut, chopped, or sectioned into any desired shape or ground to produce particles of desired sizes.

During the drying procedure, the diameter of the wafers decreased slightly (from 0.925 inch to approximately 0.90 inch) and the wafer properties were consistent with conventional RF aerogels properties (sticky to the touch and red translucent in color). Certain of the wafers, prepared in the manner described above, were then, pyrolysed in an inert (nitrogen) atmosphere at 1050° C. for a time period of 4 hours to form a carbonized aerogel (carbon foam). The wafers had a density of about 0.6 g/cc prior to carbonization and a density after carbonization of about 0.9 g/cc.

The carbon aerogel samples were placed into 5M KOH (potassium hydroxide) and capacitance measurements were made, with the results indicating a capacitance of about 19F/cc when the electrodes are charged to a 1 volt potential difference, thus establishing a use capability, such as in double layer capacitors (supercapacitor) as described and claimed in above-referenced U.S. Application Ser. No. 07/822,438.

The RF aerogel or carbon aerogel made in accordance with the present invention provides an intermediate density foam which may be used in its non-pyrolysed or non-carbonized form in thermal or acoustic insulation for example, and in its pyrolysed or carbonized form rechargeable batteries, supercapacitors, fuel cells, and chemical sensors, for example. By way of comparison, the drying time of the present invention is in hours compared to days required in the process of above-referenced U.S. Pat. Nos. 4,873,218 and No. 4,997,804 for example. In addition, the air drying equipment costs of this invention are significantly less than required for the critical point drying procedure of these same two referenced patents, for example. Thus, it has been shown that the present air drying procedure results in an aerogel fabrication process which is simpler, quicker, and less expensive than the prior known drying procedures. Therefore, this invention provides a solution to the major technical challenge of producing low cost aerogel materials.

While a specific RF aerogel formulation has been exemplified above, other formations are possible, depending on the desired properties of the user. The process in general requires that the reactants are mixed with a catalyst. The reactants (phenolic monomers) include resorcinol, phenol, catechol, phloroglucinol, and other polyhydroxy-benzene compounds that react in the appropriate ratio with formaldehyde or furfural in the presence of catalytic amounts of a base catalyst, such as sodium carbonate ($Na_2CO_3$) lithium carbonate ($Li_2CO_3$), and potassium carbonate ($K_2CO_3$), for example. In addition to resorcinol-formaldehyde, exemplified above, preferred combinations of reactants include resorcinol-furfural, phenol-resorcinol-formaldehyde, catechol-formaldehyde, and phloroglucinol-formaldehyde. Also, in addition to acetone, other solvents that may be used include methanol, isopropanol, anti amyl acetate. While the above example, utilized a pyrolyzing temperature of 1050° C., pyrolyzing may be carried out in a temperature range of about 500°–3000° C., depending on the materials, etc. involved.

While a specific example of a process utilizing the air drying procedure has been set forth, with specific materials, quantities, times, parameters, etc., set forth, such is not intended to limit the invention to the specific described process, since other process may effectively utilize the air drying procedure. Modifications and changes will become apparent to those skilled in the art and such are intended to be covered by the scope of this invention, which is to be limited only by the scope of the appended claims.

We claim:

1. In a process for producing organic aerogels, the improvement comprising:
   positioning the aerogel such that at least one surface thereof is exposed to air; and
   removing the fluid from the pores of the aerogel by air drying.
2. The improvement of claim 1, additionally including the step of positioning the aerogel material such that opposite surfaces thereof are exposed to the air so as to enable comparable drying rates of the opposite surfaces.
3. The improvement of claim 1, additionally including the step of forming the aerogel precursor to be dried by:
   forming a mixture of reactants in a solvent;
   allowing the thus formed mixture to gel;
   curing the thus formed gel to increase the cross-linking density;
   exchanging the pore fluid in the gel with a selected solvent; and
   allowing the selected solvent to evaporate during the air drying step, thereby forming an aerogel.

4. The improvement of claim 3, wherein the step of forming the mixture is carried out by at least mixing a monomer selected from the group consisting of resorcinol, phenol, catechol, phloroglucinol, and other polyhydroxybenzene compounds, with either formaldehyde or furfural in the presence of a base catalyst selected from the group of sodium carbonate, lithium carbonate, and potassium carbonate.

5. The improvement of claim 3, wherein the step of forming the mixture is carried out by mixing resorcinol, formaldehyde, and sodium carbonate in selected proportions.

6. The improvement of claim 5, wherein the step of curing is carried out at room temperature for a first period of time, at 50° C. for a second time period, and then at 90° C. for a third time period.

7. The improvement of claim 6, wherein the step of exchanging the pore fluid with a selected solvent is carried out by exchanging the fluid with acetone, and then exchanging the acetone with cyclohexane.

8. The improvement of claim 1, additionally including the step of pyrolyzing the thus dried aerogel in an inert atmosphere to form a carbonized aerogel.

9. The improvement of claim 8, wherein the atmosphere is nitrogen, and wherein the step of pyrolyzing is carried out at a temperature of 1050° C.

10. The improvement of claim 9, wherein the organic aerogel is a resorcinol/formaldehyde aerogel.

11. A method for producing an aerogel having a density in the range of 0.4–1.2 g/cc, comprising the steps of:
    forming a mixture of a polymeric material with a solvent;
    allowing the mixture to gel while minimizing any evaporation;
    curing the thus gelled mixture to form an aquagel;
    exchanging water in the aquagel with a selected solvent;
    allowing the selected solvent to at least partially evaporate; and
    air drying to form an aerogel.

12. The method of claim 11, additionally including the step of pyrolyzing the thus formed aerogel in an inert atmosphere to produce a carbonized aerogel.

13. The method of claim 12, wherein the step of pyrolyzing is carried out at a temperature of 1050° C.

14. The method of claim 13, wherein the inert atmosphere is formed of nitrogen.

15. The method of claim 12, wherein the thus produced carbonized aerogel has a density of about 0.9 g/cc.

16. The method of claim 11, wherein the step of forming the mixture is carried out by mixing resorcinol, formaldehyde, and sodium carbonate in selected proportions.

17. The method of claim 16, wherein the step of curing the thus gelled mixture is carried out at room temperature for a specified time, at 50° C. for a specified time, and then at 90° C. for a specified time.

18. The method of claim 17, additionally including the step of forming selected size pieces of the aerogel by cutting the thus formed aquagel so as to form pieces of a selected size and thickness.

19. The method of claim 17, wherein the step of exchanging water with a selected solvent is carried out by exchanging the water with acetone and then exchanging the acetone with cyclohexane.

20. The method of claim 19, additionally including the step of positioning the formed aquagel such that opposite surfaces thereof are exposed to the air to provide comparable drying rates of the opposite surfaces.

21. The method of claim 11, wherein the step of air drying is carried out at a pressure of about 0.1–1.0 atmosphere.

22. The method of claim 11, wherein the step of air drying is carried out following the step of solvent exchanging.

23. The improvement of claim 1, additionally including the step of forming the thus produced aerogel in a desired configuration, which step of forming may be carried out prior to or after the air drying step.

24. The improvement of claim 6, wherein the step of exchanging the pore fluid with a selected solvent is carried out by exchanging the fluid with acetone, followed by evaporation and air drying, thereby forming the aerogel.

* * * * *